United States Patent
Shinozaki et al.

(10) Patent No.: US 6,834,143 B2
(45) Date of Patent: Dec. 21, 2004

(54) OPTICAL MODULE AND PACKAGE THEREOF

(75) Inventors: Atsushi Shinozaki, Tokyo (JP); Takashi Shigematsu, Tokyo (JP); Toshihiko Ota, Tokyo (JP); Shigehito Yodo, Tokyo (JP)

(73) Assignee: The Furukawa Electric Co., Ltd. (JP)

( * ) Notice: Subject to any disclaimer, the term of this patent is extended or adjusted under 35 U.S.C. 154(b) by 137 days.

(21) Appl. No.: 10/157,677

(22) Filed: May 29, 2002

(65) Prior Publication Data

US 2003/0016910 A1 Jan. 23, 2003

(30) Foreign Application Priority Data

May 30, 2001 (JP) ........................................ 2001-162947

(51) Int. Cl.[7] .............................. G02B 6/34; G02B 6/26
(52) U.S. Cl. ........................................... 385/37; 385/13
(58) Field of Search .............................. 385/10, 12–14, 385/37, 49, 65, 124, 129–132

(56) References Cited

U.S. PATENT DOCUMENTS

| | | | | |
|---|---|---|---|---|
| 4,991,930 A | * | 2/1991 | Baek et al. | 385/115 |
| 6,067,392 A | * | 5/2000 | Wakami et al. | 385/37 |
| 6,101,301 A | * | 8/2000 | Engelberth et al. | 385/37 |
| 2003/0012500 A1 | * | 1/2003 | Oliveti | 385/37 |
| 2003/0012523 A1 | * | 1/2003 | Shinozaki et al. | 385/92 |
| 2003/0016909 A1 | * | 1/2003 | Shinozaki et al. | 385/37 |

* cited by examiner

*Primary Examiner*—John R. Lee
*Assistant Examiner*—Christopher M. Kalivoda
(74) *Attorney, Agent, or Firm*—Cantor Colburn LLP

(57) ABSTRACT

An optical module comprising: a comb-shaped package having a plurality of teeth portions and a base portion; and at least one optical fiber having fiber grating, wherein respective fiber-grating formed portions of at least one optical fiber are placed in corresponding teeth portions and base portion of said package, and the optical fiber is fixed to the base portion and corresponding teeth portion in such manner that the fiber-grating formed portion exists between the base portion and the corresponding teeth portion.

13 Claims, 2 Drawing Sheets

OPTICAL MODULE AND PACKAGE THEREOF

FIELD OF THE INVENTION

The present invention relates to an optical module and a package applied to the optical module used in optical communications, for example.

DESCRIPTION OF THE RELATED ART

Fiber gratings form diffraction gratings obtained by causing periodical variations in the refractive index along the length of an optical fiber. For example, fiber gratings are formed by irradiating an optical fiber with an interference pattern of ultraviolet light so as to cause light-induced variations in the refractive index in a core of the optical fiber.

The interference pattern of ultraviolet light may be formed by applying the ultraviolet light through a mask (phase mask) provided with a grating forming pattern. Such a method for forming a grating using the phase mask is called a phase mask method. Further, a holographic method or the like is known which does not use the phase mask to form the interference pattern of ultraviolet.

The fiber gratings have the function of reflecting light with a relatively narrow range of wavelengths with the Bragg reflection wavelength as the center. The Bragg reflection wavelength is determined from the spacing of the diffraction grating and the effective refractive index of the core. Such fiber gratings are used as a single-wavelength filter with excellence in wavelength selection.

In addition, when it is assumed that the Bragg reflection wavelength of a fiber grating is $\lambda$, the effective refractive index is n, and grating pitch is $\Lambda$, there is a relationship therebetween that $\lambda$ is equal to $2n\Lambda$ ($\lambda=2n\Lambda$). Since both the effective refractive index n and grating pitch $\Lambda$ have the temperature dependency, it is known that, for example, the Bragg reflection wavelength of a silica-based optical fiber has the temperature dependency of about 0.01 nm/° C. to 0.015 mm/° C.

The temperature dependency of the Bragg reflection wavelength is so-called positive temperature dependency where the effective refractive index and grating pitch increase as the temperature increases.

Then, in order to compensate for the temperature dependency of the Bragg reflection wavelength, a method has been proposed for forming a temperature-compensating package for fiber gratings using a member with a negative linear expansion coefficient or a member obtained by combining two types of materials with different linear expansion coefficients, and fixing an optical fiber with fiber gratings to the temperature-compensating package.

In addition, thus proposed temperature-compensating package applies a stress in the direction that decreases a length of a fiber-grating formed portion of the optical fiber as the temperature increases, but it is difficult to compress the optical fiber by the stress.

Then, it is designed in the proposed optical module that an optical fiber is fixed to the temperature-compensating package with a predetermined set tensile stress applied to the optical fiber, for example, at room temperature (for example, 25° C.), and thereby the tensile stress decreases or becomes zero at high temperature. The optical module is produced by fixing the optical fiber to the temperature-compensating package while applying the set tensile stress to the optical fiber at room temperature.

In this way, in the proposed optical module it is possible to provide the stress applied to the fiber gratings from the temperature-compensating package with negative temperature dependency (it is possible to suppress increases in the pitch of the fiber-grating formed portion as the temperature increases), and therefore, it is possible to compensate for the positive temperature dependency of the refractive index of an optical fiber.

In addition, when the optical fiber provided with fiber gratings is fixed to the temperature-compensating package, a fixing material is used such as a low-melting-point glass, metallic solder or adhesive agent.

With progresses in computerized society, the communication information amount tends to increase dramatically, demanding increases in speed and capacity, which are necessary and indispensable, in optical fiber communications. As an approach to increasing the speed and capacity, a wavelength division multiplexing scheme has been studied that transmits signal light with a plurality of wavelengths that are different from one another at set wavelength intervals, for example, 0.8 nm, using a single optical fiber.

With the study on the wavelength division multiplexing scheme, in recent years, optical components have been required such as OADM (Optical Add Drop Multiplexer) capable of selectively extracting or adding light with a plurality of wavelengths such as four-wave and twenty-wave from/to the transmitted wavelength-multiplexed light.

In order to assemble such optical components, for example, it is considered that a plurality of optical modules are connected each composed of a package accommodating an optical fiber, fixed to the package, with fiber gratings formed therein, and that Bragg reflection wavelengths reflected by fiber gratings of the optical modules are set at respective wavelengths that are different from one another.

However, because such an optical component is formed by connecting a plurality of optical modules, there arise problems that the cost is increased and the optical component is enlarged corresponding to such a configuration. Therefore, an optical module is required that enables a plurality of fiber gratings to be accommodated collectively in a package. However, conventionally, an optical module has not been proposed in which a plurality of fiber gratings are collectively accommodated in a package.

Further, since the wavelength interval is narrow, as described above, for selectively extracting or adding light in an optical component such as OADM, it is required in the optical module composing the optical component that the Bragg reflection wavelength is coincident with a set wavelength accurately.

However, because the Bragg reflection wavelength of a fiber grating depends on tensile, as well as temperature and is affected by contraction, expansion, heat, or the like of the fixing material, it is extremely difficult to make a difference between the Bragg reflection wavelength and set wavelength less than or equal to, for example, 0.1 nm.

SUMMARY OF THE INVENTION

An optical module comprising: a comb-shaped package having a plurality of teeth portions and a base portion; and at least one optical fiber having fiber grating, wherein respective fiber-grating formed portions of said at least one optical fiber are placed in corresponding teeth portions and base portion of said package, and said optical fiber is fixed to said base portion and corresponding teeth portion in such manner that said fiber-grating formed portion exists between said base portion and said corresponding teeth portion.

DETAILED DESCRIPTION OF THE PREFERRED EMBODIMENTS

Figure 1A:
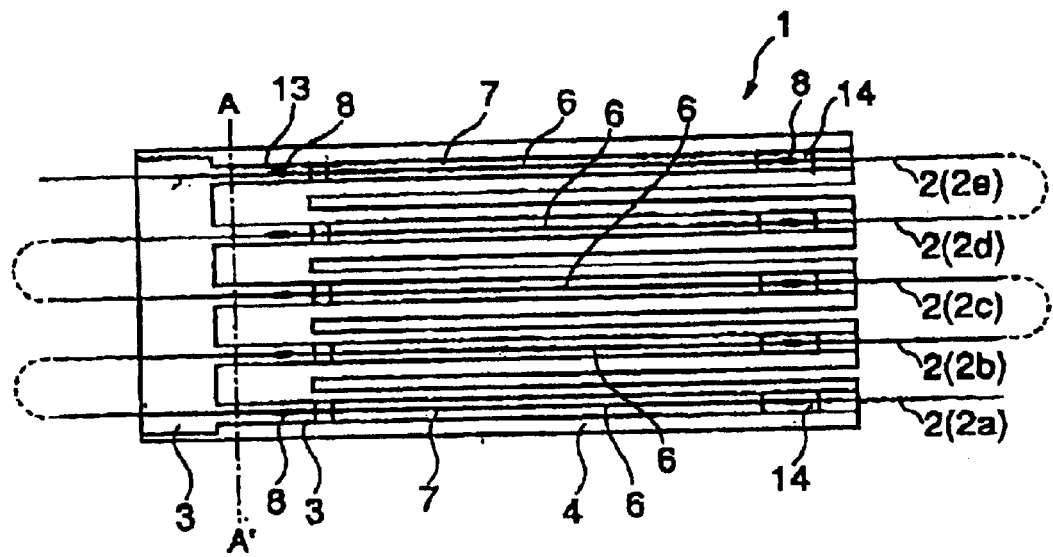
FIG. 1 is a diagram illustrating one embodiment of an optical module of the present invention.

An embodiment of an optical module of the present invention will be described below with accompanying drawings. It is an object of the present invention to provide an optical module capable of accommodating a plurality of optical fibers with fiber gratings and of adjusting the Bragg reflection wavelength of each of the fiber gratings separately and optionally.

In one embodiment of the present invention, an optical module comprising a comb-shaped package having a plurality of teeth portions and a base portion; and at least one optical fiber having fiber grating, wherein respective fiber-grating formed portions of the at least one optical fiber are placed in corresponding teeth portions and base portion of the package, and the optical fiber is fixed to the base portion and corresponding teeth portion in such manner that the fiber-grating formed portion exists between the base portion and the corresponding teeth portion.

Further, in the optical module of the present invention, the teeth portions of the package are formed of a member that is different from a member of at least part of the base portion, the optical fiber is fixed to a first package member at one end side of the fiber-grating formed portion in the base portion, while the optical fiber is fixed to a second package member at other end side of the fiber-grating formed portion in the teeth portion, the second package member having linear expansion coefficient different from that of the first package member. After the optical fiber is fixed to the first package member and the second package member, a distortion is applied to at least one of the first package member and the second package member so as to adjust a Bragg reflection wavelength of each of the fiber gratings. Further, in order for the Bragg reflection wavelength of the fiber grating to be approximately coincident with a set wavelength, at least one of the first package member and second package member is given a distortion.

Moreover, the distortion is applied to at least one of the first package member and the second package member, and a package member with the distortion applied has a lower linear expansion coefficient than that of other package member. The first package member is formed of aluminum, and the second package member is formed of an INVAR material and the distortion is applied to the second package member. The package members composing the package have negative linear expansion coefficients. After the optical fiber is fixed to the package member, the package member is given a distortion to adjust the Bragg reflection wavelength of the fiber grating. The distortion is applied to the package member so as to cause the Bragg reflection wavelength of each of the fiber gratings to be approximately coincident with a set wavelength. The distortion of the package member is applied by plastic deformation. The optical fiber has a core and a clad which covers the outer circumference of the core, and a specific refractive index difference of the core to clad is at least 0.35%.

The package of the present invention is a comb-shaped package applied to the optical module of the present invention.

Since the optical module has a package formed into the shape of a comb comprising a base portion and teeth portions, the optical fiber is fixed to the base portion and teeth portion in such manner that a fiber-grating formed portion exists between the base portion and the corresponding teeth portion, and it is thereby possible to collectively accommodate a plurality of optical fibers having fiber gratings in the package.

Further, in the optical module of the invention, when the fiber-grating formed portions are arranged in place and the optical fibers are fixed to the package, it is possible to fix the optical fibers to the package, while applying corresponding stresses to the respective fiber gratings. Therefore, the Bragg reflection wavelengths of the respective fiber gratings are readily matched with the set wavelengths, individually.

Furthermore, in the optical module of the invention, as described above, the teeth portions are formed of a member that is different from that of at least part of the base portion in the package. By appropriately selecting the linear expansion coefficients of the different members, it is possible to reduce the thermal dependency of the fiber gratings, and to separately and more accurately adjust Bragg reflection wavelengths of the respective fiber gratings of a plurality of optical fibers placed in the teeth portions and the base portion, as described below.

More specifically, in the optical module of the invention, as described above, the optical fiber is fixed to the first package member at one end side of the fiber-grating formed portion in the base portion, and is fixed to a second package member at the other end side of the fiber-grating formed portion in the teeth portion (i.e., the optical fiber is fixed to the first package member in the base portion and the second package member in the teeth portion in such manner that the fiber-grating formed portion exists between the fixing point of the first package member and the fixing point of the second package member). The second package member has a linear expansion coefficient different from that of the first package member. Then, at least one of the first package member and second package member is given a distortion to adjust the Bragg reflection wavelength of the fiber grating of the optical fiber.

As a result, even if the Bragg reflection wavelength of the fiber grating comes to differ from the set wavelength due to the contraction of the fixing member of the like when the optical fiber is fixed to the package, the Bragg reflection wavelength of each of the fiber gratings is separately and accurately adjusted by means of the distortion applied to the package member after fixing the optical fiber.

In the optical module of the invention, also in the case where the package is formed of a package member having a negative linear expansion coefficient, it is possible to separately and accurately adjust the Bragg reflection wavelength of each of the fiber gratings even if the Bragg reflection wavelength comes to differ from the set wavelength due to the contraction of the fixing member of the like when the optical fiber is fixed to the package by means of the distortion applied to the package member.

As described above, in the optical module of the invention, it is possible to collectively accommodate a plurality of optical fibers having fiber gratings in such condition that the Bragg reflection wavelength of each of the fiber gratings is matched with the set wavelength. Further in the case where a distortion is applied to the package member after fixing the optical fiber to the package, it is possible to separately adjust the Bragg reflection wavelength of each of the fiber gratings to be approximately coincident with the set wavelength even if the Bragg reflection wavelength of the fiber grating comes to differ from the set wavelength due to the contraction of the fixing member or the like when the optical fiber is fixed to the package by means of the appropriately adjusting the distortion.

Accordingly, it is possible to provide a high quality of optical components having a multiwavelength reflection filter function which selectively reflects lights with a plurality of wavelengths such as four-wave and twenty-wave from the transmitted wavelength-multiplexed light.

FIG. 1 is a diagram illustrating one embodiment of the optical module of the invention, and FIG. 1(a) is a plan view of the optical module.

As shown in FIG. 1(a), the optical module of this embodiment has one or more (in this case, five) optical fibers 2 (2a to 2e) each with a fiber grating formed therein, and a package 1 to which the optical fibers 2 (2a to 2e) are fixed, and the package 1 is formed into a comb-shaped comprising a base portion and teeth portions.

Figure 1B:
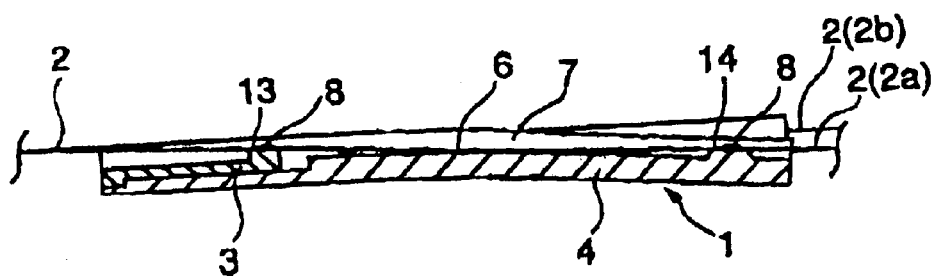
Figure 1C:
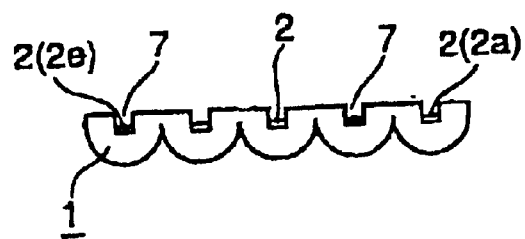

FIG. 1(b) is a cross-sectional view of the optical module taken along the optical fiber 2a, and FIG. 1(c) is a cross-sectional view taken along the line A–A' of FIG. 1(a).

As shown in FIGS. 1(a) to 1(c), respective fiber-grating formed portions 6 of the optical fibers (2a to 2e) are placed in respective teeth portions and base portion of the package 1. In the package 1, the teeth portions are formed of a member that is different from a member of at least part of the base portion, and the part of the base portion of the comb-shaped package is formed of a first package member 3, while the teeth portions and the rest of the base portion are formed of a second package member 4. In other words, the base portion and teeth portions of the comb-shaped package are integrally formed by the second package member 4, and the first package member 3 is mounted on thus formed base portion of the second package member 4, thereby forming the package 1. The first package member 3 has portions corresponding to the teeth portions of the second package member 4.

In one embodiment of the invention, the first package member 3 is formed of aluminum having a linear expansion coefficient of $2.27 \times 10^{-5}/°C$., while the second package member 4 is formed of an INVAR material (INVAR (36FN)) having a linear expansion coefficient of $1.6 \times 10^{-6}/°C$. The first package member 3 has a larger linear expansion coefficient than the optical fibers 2, and the second package member 4 has a remarkably lower linear expansion coefficient than both of the linear expansion coefficient of the optical fibers 2 and the first package member 3.

With respective to one end side and the other end side, between which the respective fiber-grating formed portion 6 is provided, of each of the optical fibers 2 (2a to 2e), the optical fiber is fixed to the first package member 3 at a fixing portion 13 (i.e., one end side) in the base portion by an adhesive agent 8, while the optical fiber is fixed to the second package member 4 at a fixing portion 14 (i.e., the other end side) in a front end portion of the teeth portion by the adhesive agent 8.

In addition, as shown in FIG. 1(c), a cross section of the package 1, cut along a surface vertical to the longitudinal direction of the optical 2, is shaped in the form of approximate semicircles connected in parallel. A groove is formed along the teeth portion of the package to receive the optical fiber. More specifically, in cross section, a concavity portion 7 in the form of an approximate rectangle is formed at the center portion of each of the semicircles, and the optical fiber is placed in the bottom portion of the concavity portion 7. As shown in FIGS. 1(a) and 1(b), the fixing portions 13 and 14 are formed at the bottom side of the concavity portion 7 with an interval therebetween along the length of the optical fiber, and each of the optical fibers 2 (2a to 2e) is fixed at the fixing portions 13 and 14 so as to be placed inside of the concavity portion 7 of the package.

In the optical module of the invention, when the optical fibers 2 (2a to 2e) are fixed to the package, each of the optical fibers 2 (2a to 2e) is placed in a tension-applying jig. Then, in order for the Bragg reflection wavelength of the fiber grating to be in agreement with the set wavelength, corresponding set tensile stress is separately applied to each of the optical fibers 2 (2a to 2e) at room temperature, and the optical fibers 2 (2a to 2e) are fixed to the first package member 3 and second package member 4.

Further, in the optical module of the invention, after the optical fibers 2 (2a to 2c) are fixed to the package member 3 and second package member 4, at least one of the first package member 3 and second package member 4 (in this embodiment, the second package member 4) is given a distortion to approximately agree with the Bragg reflection wavelength of the fiber grating of each of the optical fibers 2 (2a to 2c) with a corresponding Bragg reflection wavelength.

Figure 2:
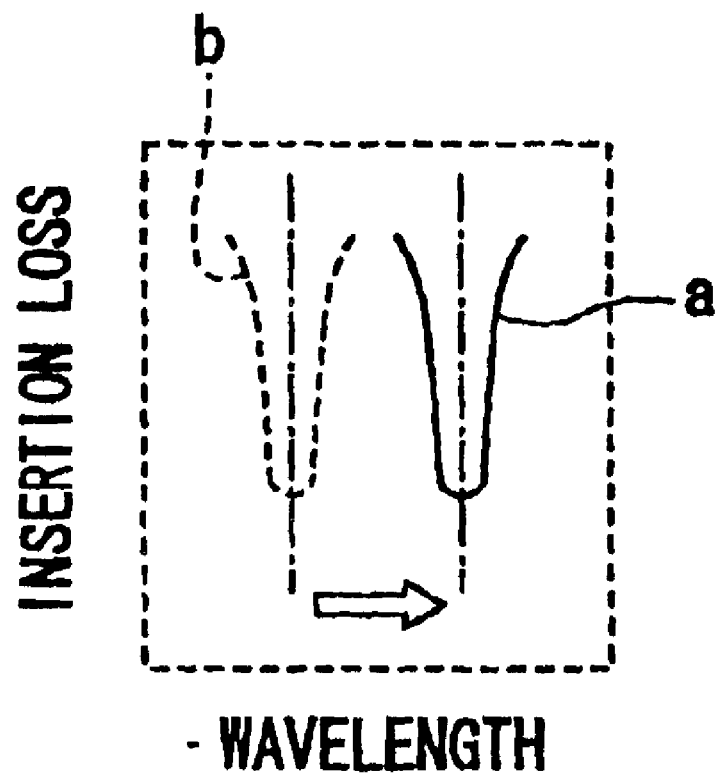
FIG. 2 is an exemplary diagram illustrating a Bragg-reflection-wavelength adjusting effect of the optical fiber in the above one embodiment.

The distortion is given by applying a plastic deformation to the second package member 4. For example, as shown in FIG. 1(b), by means of upwardly warping the second package member 4 forming the teeth portion and base portion, the tensile stress applied to the optical fiber 2 (2a) is adjusted to be larger than the set tensile stress. Thus, as shown in FIG. 2, the Bragg reflection wavelength of the fiber grating is shifted to a longer wavelength (the light spectrum is shifted from the characteristic line b to characteristic line a), and the Bragg reflection wavelength is approximately coincident with the set wavelength.

In addition, in FIG. 1(b), although a deformation amount of the second package member 4 is exaggerated for purposes of illustration, the deformation amount of the second package member 4 is approximately a few $\mu$m even when a dislocation amount of the Bragg reflection wavelength is 0.2 nm, and is an extremely small value less than a production error of the second package member 4.

In contrast to the foregoing, when applying a plastic deformation downwardly to the second package member 4, the tensile stress applied to the optical fiber 2 is adjusted to be smaller than the set tensile stress, and the Bragg reflection wavelength of the fiber grating of the optical fiber 2 is shifted to a shorter wavelength.

As described above, the optical module of the invention provides the second package member 4 with the above-mentioned distortion after fixing the optical fibers (2a to 2e) to respective teeth portions and base portion of the package 1, and thereby causes respective Bragg reflection wavelengths of the fiber gratings of the optical fibers 2 (2a to 2e) placed in the package to approximately coincide (make a difference between the Bragg reflection wavelength and the set wavelength to be less than or equal to 0.01 nm) with set wavelengths, separately.

As described above, since the optical module of the invention has the package 1 formed into a comb-shape, and fiber-grating formed portions 6 of the optical fibers 2 (2a to 2e) placed in respective base portion and teeth portions of the package 1, the optical fibers 2 (2a to 2e) can be fixed to the package while applying respective tensile stresses separately to the optical fibers 2 (2a to 2e). Therefore, the optical module enables a plurality of optical fibers with fiber gratings to be accommodated collectively in a package, and further enables the Bragg reflection wavelength of each of the fiber gratings to be matched with the set wavelength readily.

Further, in the optical module of the invention, since the Bragg reflection wavelength of the fiber grating of each of the optical fibers 2 is approximately coincident with the set wavelength by means of providing the second package member 4 with a distortion after fixing the optical fibers 2 to the first package members 3 and second package member 4, for example, even if the Bragg reflection wavelength of the fiber grating of each of the optical fibers 2 is dislocated from the set wavelength due to contraction fluctuation of the adhesive agent 8 or the like when fixing the optical fibers 2 to the first package member 3 and second package member 4, it is possible to compensate for the dislocated amount by means of the distortion applied to the second package member 4 and to accurately adjust the Bragg reflection wavelength to agree with the set wavelength.

Furthermore, since the distortion is applied by the plastic deformation of the second package member 4, it is possible to adjust the distortion very easily, to fabricate the optical module readily, and to improve yields of the optical module.

Moreover, in the optical module of the invention, since each of the optical fibers 2 at one end side of the fiber-grating formed portion 6 is fixed to the first package member 3 having a larger linear expansion coefficient than the optical fibers 2, while the optical fiber at the other end side of the fiber-grating formed portion 6 is fixed to the second package member 4 having a lower linear expansion coefficient than the optical fibers 2, the package 1 applies a stress to each of the optical fibers 2 in the direction of suppressing the stress which causes each of the optical fibers 2 to expand in its longitudinal direction, as temperature rises, and thereby suppresses the expansion of the fiber grating pitch, etc.

Accordingly, the optical module of the invention is capable of suppressing the temperature dependency of the Bragg reflection wavelength of a fiber grating.

Further, in the optical module of the invention, since an INVAR material with a remarkably low linear expansion coefficient is used as the second package member 4 which is provided with a plastic deformation to cause the Bragg reflection wavelength of the fiber grating to coincide with the set wavelength, it is possible to obtain the same effect of suppressing the temperature dependency of the Bragg reflection wavelength as the effect in the case that the plastic deformation is not applied.

Furthermore, in the optical module of the invention, the first package member 3 is formed of aluminum, while the second package 4 is formed of an INVAR material. It is possible to obtain the package 1 at low cost and with ease in fabrication, and to obtain the optical module at low cost and with case in fabrication.

Still furthermore, in the optical module of the invention, since the specific refractive index difference of the core to the clad of the optical fibers 2 is at least 0.35%, it is possible to reduce the distortion amount for adjustment which is to be applied to the second package member 4, to further facilitate the fabrication of the optical module, and to efficiently effect the compensation for the temperature dependency of the Bragg reflection wavelength of the fiber grating of each of the optical fibers 2.

In addition, the optical module of the invention is not limited to the aforementioned embodiments, and is capable of adopting various embodiments. For example, although in the aforementioned embodiment the first package member 3 is formed of aluminum and the second package member 4 is formed of an INVAR material, materials forming the first package member 3 and second package member 4 are not limited thereto and may be any materials.

Moreover, in the aforementioned embodiment, only the second package member 4 is plastic-deformed, however, the first package member 3 may be plastic-deformed together with the second package member. In addition, in order to more efficiently exhibit the effect, due to the package 1, of compensating for the temperature dependency of the Bragg reflection wavelength of the fiber grating of each of the optical fibers 2 (2a to 2e), it is preferable to provide only the second package member 4 having a lower linear expansion coefficient with, for example, a plastic deformation to apply a distortion to adjust the Bragg reflection wavelength of the fiber grating, and further it is preferable to provide the second package member 4 located in the teeth portion side with a plastic deformation, for easy deformation and accurate adjustment of the deformation amount.

Further, in the aforementioned embodiment, the second package member 4 is plastic-deformed to apply a distortion to adjust the Bragg reflection wavelength of the fiber grating of each of the optical fibers (2a to 2e). However, in addition to the plastic deformation, the Bragg reflection wavelength of the fiber grating of the optical fiber may be adjusted by a method for applying a distortion to a package member by means of a laser such as a YAG laser, or providing a package member with tears to apply a distortion.

Furthermore, in the aforementioned embodiment, a specific refractive index difference of the core to the clad of each of the optical fibers 2 (2a to 2e) is not less than 0.35%. However, a specific refractive index difference of the core to the clad of each of the optical fibers 2 (2a to 2e) is not limited thereto, and may be set as appropriate.

Still furthermore, in the aforementioned embodiment, the package 1 is formed by two package members (first package member 3 and second package member 4) with respective materials different from one another. However, the package 1 may be formed by three or more package members.

The package 1 may be formed by a single member having a negative linear expansion coefficient such as a glass ceramic or solid crystal polymer. Also in this case, the comb-shaped package 1 facilitates to cause respective Bragg reflection wavelengths of fiber gratings to be separately agree with set wavelengths. Further, by providing the package member with a distortion after fixing the optical fibers 2 to the package 1, it is possible to adjust the Bragg reflection wavelength of the fiber grating of each of the optical fibers (2a to 2e), and to separately cause the respectively Bragg reflection wavelengths of fiber gratings to approximately coincide with set wavelengths.

Moreover, in the aforementioned embodiment, the optical fibers 2 are fixed to the package 1 using the adhesive agent 8. However, fixing materials other than the adhesive agent 8 may be used to fix the optical fibers 2 to the package 1.

Further, in the optical module of the invention, a distortion is not necessarily applied to the package after fixing the optical fibers 2 (2a to 2e) to the package 1. In other words, without applying a distortion after fixing the optical fibers, by forming the package 1 in a comb-shape and applying a set tensile stress separately to each of the optical fibers 2 (2a to 2e) when fixing the optical fibers, it is possible to obtain an optical module enabling respective Bragg reflection wavelengths of fiber gratings of the optical fibers 2 (2a to 2e) to be approximately equal to set wavelengths, separately, and further enabling a plurality of types of fiber gratings to be collectively accommodated.

Furthermore, in the aforementioned embodiment, five optical fibers 2 (2a to 2e) are fixed to the package 1, but the number of optical fibers 2 is not limited thereto and may be set as appropriate. For example, as shown by broken line in FIG. 1, a single optical fiber 2 with a plurality of fiber gratings formed in series at predetermined intervals is bent to be fixed to the package 1, thereby forming an optical module.

According to the optical module of the invention, fiber-grating formed portions are provided in corresponding teeth portions and base portion of the comb-shaped package, and with respect to one end side and the other end side, between which the respective fiber-grating formed portion 6 is provided, of each of the optical fibers 2 (2a to 2e), the optical fiber at the one end side is fixed to the teeth portion, while the optical fiber at the other end side is fixed to the base portion. Therefore, by placing fiber gratings in corresponding teeth portions and base portion, it is possible to collectively accommodate a plurality of optical fibers having fiber gratings in the package. The fiber gratings may be the same or may be different from one another.

Moreover, according to the optical module of the invention, since it is possible to fix the optical fibers while applying respective stresses to the fiber grating portions when placing the fiber gratings in the corresponding teeth portions and base portion, it is easy to cause the respective Bragg reflection wavelengths of the fiber gratings to agree with set wavelengths, separately.

Further, in the optical module of the invention, when the package is formed by different members in teeth portions and at least part of the base portion of a comb-shaped package, by setting respective linear expansion coefficients of the different members as appropriate, it is possible to form a package capable of effecting the temperature compensation of the fiber gratings accurately, and to obtain an optical module with the temperature dependency of the fiber gratings suppressed.

Furthermore, in the optical module of the invention having the comb-shaped package formed of different members in teeth portions and at least part of the base portion of the comb shape, according to the embodiment in which after fixing the optical fiber at one end side of the fiber grating to the first package member in the base portion and further fixing the optical fiber at the other end side of the fiber grating to the second package member in the teeth portion, at least one of the first packaging member and the second packaging member is provided with a distortion to adjust the Bragg reflection wavelength of the fiber grating of the optical fiber, even if the Bragg reflection wavelength of the fiber grating is dislocated from the set wavelength because, for example, contraction of a fixing material occurs when fixing the optical fiber, it is possible to adjust the Bragg reflection wavelength of each of the fiber gratings separately.

Still furthermore, in the optical module of the invention having the comb-shaped package formed of different members in teeth portions and at least part of the base portion of the comb shape, by means of the distortion to cause the Bragg reflection wavelength of the fiber grating of the optical fiber to approximately coincide with the set wavelength, even if the Bragg reflection wavelength of the fiber grating is dislocated from the set wavelength due to the contraction of a fixing material or the like, it is possible to cause the Bragg reflection wavelength of each of the fiber gratings to approximately coincide with the set wavelength.

In the optical module of the invention in which the teeth portions are formed of a member different from a member of at least part of the base portion, only either one of the first package member or the second package member is provided with a distortion, and when the package member provided with the distortion has a lower linear expansion coefficient than the other package member, for example, it is possible to efficiently effect, due to the package, compensation for the temperature dependency of the Bragg reflection wavelength of the fiber grating of the optical fiber.

Further, in the optical module of the invention in which the teeth portions are formed of a member different from that of at least part of the base portion, namely, the first package member is formed of aluminum while the second package member is formed of an INVAR material, and when a distortion is applied to the second package member, it is possible to obtain the optical module which is easily fabricated at low cost.

In the optical module of the invention in which the package is formed by a package member having a negative linear expansion coefficient, by setting the linear expansion coefficient of the package member as appropriate, it is possible to form a package capable of accurately effecting the temperature compensation of the fiber gratings, and to obtain an optical module with the suppressed temperature dependency of the fiber gratings.

Further, in the optical module of the invention in an embodiment in which the package is formed of a package member having a negative linear expansion coefficient, in the case of providing the package member with a distortion to adjust the Bragg reflection wavelength of the fiber grating of the optical fiber after fixing the optical fiber to the package, even when the Bragg reflection wavelength of the fiber grating differs from the set wavelength because, for example, contraction of a fixing material occurs in fixing the optical fiber, it is possible to adjust the Bragg reflection wavelength of each of the fiber gratings separately.

Furthermore, in the optical module of the invention with a configuration in which the package is formed of a package member having a negative linear expansion coefficient, by causing the Bragg reflection wavelength of the fiber grating of the optical fiber to generally coincide with the set wavelength using the distortion, even when the Bragg reflection wavelength of the fiber grating differs from the set wavelength because, for example, contraction of a fixing material occurs in fixing the optical fiber, it is possible to cause the Bragg reflection wavelength of each of the fiber gratings to coincide with the set wavelength.

In the optical module of the invention, when a distortion of the package member is provided by applying a plastic deformation to the package member, since it is possible to provide a distortion to adjust the Bragg reflection wavelength of the fiber grating of the optical fiber with ease and with accuracy, using the distortion enables the Bragg reflection wavelength of the fiber grating to be adjusted with ease and with accuracy.

In the optical module of the invention, in an embodiment where the optical fiber has a core and clad covering the outer circumference of the core and the specific refractive index difference of the core to clad is not less than 0.35%, it is possible to decrease the adjusting distortion amount used in applying the distortion to a package member to adjust the Bragg reflection wavelength of the fiber grating, to further facilitate the production of the optical module, and to efficiently exhibit the effect, due to the package, of compensating for the temperature dependency of the Bragg reflection wavelength of the fiber grating of the optical fiber.

As described above, because the optical module of the present invention is capable of accommodating a plurality of fiber gratings collectively and of separately adjusting the Bragg reflection wavelengths readily, by applying the optical module of the invention, it is possible to assemble optical components of high quality provided with the multiwavelength reflection filtering function of selectively reflecting light with a plurality of wavelengths such as four-wave and twenty-wave from the transmitted wavelength-multiplexed light.

Further, the package of the present invention has a simple structure and the above-mentioned excellent effects.

What is claimed is:

1. An optical module comprising:
   a comb-shaped package having a plurality of flexible teeth portions and a base portion; and
   at least one optical fiber having plural fiber-grating portions,
   wherein respective fiber-grating formed portions of said at least one optical fiber are placed in corresponding teeth portions and base portion of said package, and said optical fiber is fixed to said base portion and corresponding teeth portion in such manner that said fiber-grating formed portion exists between said base portion and said corresponding teeth portion.

2. An optical module comprising:
   a comb-shaped package having a plurality of teeth portions and a base portion; and
   at least one optical fiber having plural fiber-grating portions,
   wherein respective fiber-gratings formed portions of said at least one optical fiber are placed in corresponding teeth portions and base portion of said package, and said optical fiber is fixed to said base portion and corresponding teeth portion in such manner that said fiber-grating formed portion exists between said base portion and said corresponding teeth portion,
   wherein said teeth portions of said package are formed of a member that is different from a member of at least part of said base portion, said optical fiber is fixed to a first package member at one end side of said fiber-grating formed portion in said base portion, while said optical fiber is fixed to a second package member at other end side of said fiber-grating formed portion in said teeth portion, said second package member having a linear expansion coefficient different from that of said first package member.

3. The optical module of claim 2, wherein after said optical fiber is fixed to said first package member and said second package member, a distortion is applied to at least one of said first package member and said second package member so as to adjust a Bragg reflection wavelength of each of said fiber gratings.

4. The optical module of claim 3, wherein said distortion is applied to at least one of said first package member and said second package member so as to cause said Bragg reflection wavelength of each of said fiber gratings to be approximately coincident with a set wavelength.

5. The optical module of claim 3, wherein said distortion is applied to any one of said first package member, and said second package member forming, and said package member applied with said distortion has is made of a material with a lower linear expansion coefficient than that of said other package member.

6. The optical module of claim 3, wherein said first package member is formed of aluminum, while said second package member is formed of an INVAR material and said distortion is applied to said second package member.

7. The optical module of claim 1, wherein said comb-shaped is made of a material with a negative linear expansion coefficient.

8. An optical module comprising:
   a comb-shaped package having a plurality of teeth portions and a base portion; and
   at least one optical fiber having plural fiber-grating portions,
   wherein respective fiber-grating formed portions of said at least one optical fiber are placed in corresponding teeth portions and base portion of said package, and said optical fiber is fixed to said base portion and corresponding teeth portion in such manner that said fiber-grating formed portion exists between said base portion and said corresponding teeth portion,
   wherein said comb-shaped package is made of a material with a negative linear expansion coefficient,
   wherein after said optical fiber is fixed to said comb-shaped package, a distortion is applied to said comb-shaped package member so as to adjust a Bragg reflection wavelength of each of said fiber gratings.

9. The optical module of claim 8, wherein said distortion is applied to said package member so as to cause said Bragg reflection wavelength of each of said fiber gratings to be approximately coincident with a set wavelength.

10. The optical module of claim 3, wherein said distortion is applied by plastic deformation.

11. The optical module of claim 1, wherein said optical fiber has a core and a clad which covers outer circumference of said core, and a specific refractive index difference of said core to said clad is at least 0.35%.

12. A comb-shaped package for an optical module, said package comprising:
   a plurality of flexible teeth portions and a base portion;
   at least one optical fiber having fiber grating,
   wherein respective fiber-grating formed portions of said at least one optical fiber are placed in corresponding teeth portions and base portion of said package, and said optical fiber is fixed to said base portion and corresponding teeth portion in such manner that said fiber-grating formed portion exists between said base portion and said corresponding teeth portion.

13. The optical module of claim 8, wherein said distortion is applied by plastic deformation.

* * * * *